Jan. 24, 1967 ROBERT AKASHI 3,299,933
CAP NUT
Filed March 23, 1965
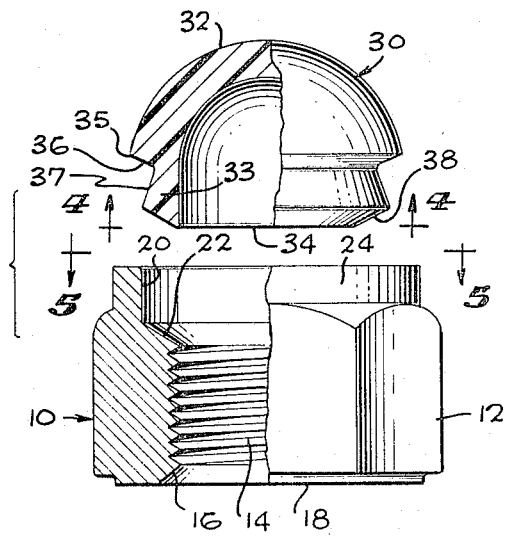
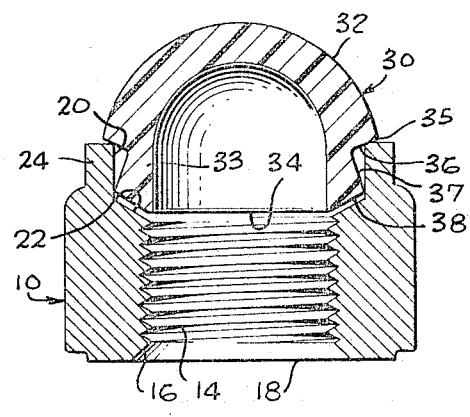
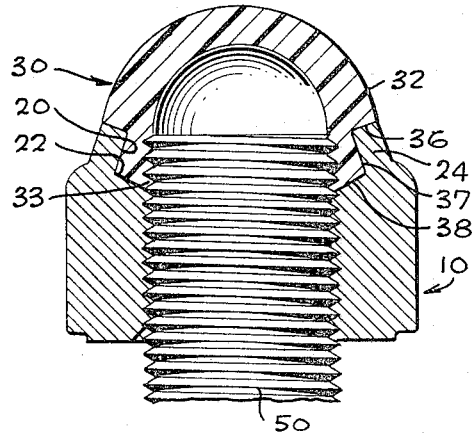
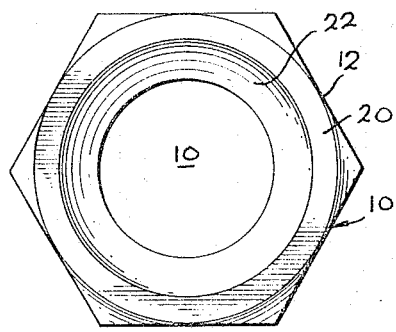
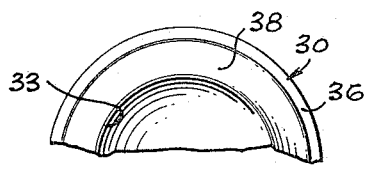
INVENTOR
ROBERT AKASHI
BY
ROBERT E. GEAUQUE &
GEORGE H. HALBERT
ATTORNEYS

United States Patent Office 3,299,933
Patented Jan. 24, 1967

3,299,933
CAP NUT
Robert Akashi, Gardena, Calif., assignor to Franklin S. Briles, Inc., El Segundo, Calif., a corporation of California
Filed Mar. 23, 1965, Ser. No. 442,048
5 Claims. (Cl. 151—7)

This invention relates to a nut, and more particularly to a cap or acorn nut which is an assembly of two separately manufactured members, and which may be readily adapted to serve as a self-locking nut.

Cap nuts in common usage have their domed caps integrally formed with the body portions of the nuts, thus capping the bores, and consequently internal top threading of such nuts is rendered more difficult than would be the case if a through bore were provided, because the length of penetration of the top must be strictly controlled. Additionally, substantial internal machining in a confined area is required to produce such nuts.

It is an object of the present invention to provide a cap nut which is produced in two separate parts, the dome or cap member being produced separately from the body member, and the body member being through-bored, so that the thread topping operation is easily performed.

It is a further object of the invention to provide such a two-part nut in which the dome or cap member may be readily molded, and in the production of which extensive internal machining is eliminated.

It is yet another object of the invention to provide such a nut which is easily assembled to form a rugged, rigid nut of the character described.

It is still a further object of the invention to provide a cap nut having self-locking features.

With these and other objects in view, the invention consists of the construction, arrangement and combination of the various elements of the invention whereby the objects contemplated are attained, as hereinafter set forth, pointed out in the appended claims, and illustrated in the accompanying drawings, in which:

FIG. 1 is a side elevational, exploded view of the nut of the present invention, partly in section.

FIG. 2 is a vertical cross-sectional view of the nut, with the dome or cap member thereof disposed adjacent to the body member, prior to crimping and assembly.

FIG. 3 is a view similar to FIG. 2, but after assembly, and with the nut mounted on a bolt or stud.

FIG. 4 is a view taken on line 4—4 of FIG. 1 and partially broken away.

FIG. 5 is a view taken on line 5—5 of FIG. 1.

The cap nut of the present invention has a body member, generally designated 10. Body member 10 has a wrenching area 12 which, as illustrated in FIGS. 1 and 5, may be hexagonal, although no limitation is thereby intended.

A through, threaded bore 14 is formed in the body member 10, which bore 14 may be chamfered, as at 16, at a bearing surface 18. The threaded bore portion may be regarded as the main section of the body member.

The body member 10 is counterbored, as at 20, the bottom 22 of the counterbore 20 being tapered at an obtuse angle relative to the counterbore 20 and providing an annular seat. The counterbore 20 defines the inner surface of an annular flange 24 on the body portion 10. The terminal or free end of this flange is flat and annular as seen in FIGURES 1 and 5. This end is inturned when crimping is completed as shown in FIGURE 3, later described.

A hollow dome or cap member, generally designated 30, is separately formed. Cap member 30 is preferably molded of plastic material, such as nylon or Teflon, although any material softer than the material of which body portion 10 is made but sufficiently hard to perform the normal functions of a cap of such a nut will be satisfactory for the purposes intended. The cap member 30 has an upper hemispherical dome section 32, a generally cylindrical body or engagement section 33, and a base 34.

The exterior surface of the cap member 30 is notched or recessed as at 35 adjacent the base 34 so as to define a step or shoulder 36 and a floor or external conical surface 37. The depth of the step 36 preferably is equivalent to the thickness of the flange 24 on the body member 10 so that, when the cap member 30 is mounted on the body member 10 and the flange 24 is crimped, as shown in FIG. 3 and as hereinafter described, a smooth, continuous surface will be presented. The floor 37 of the notch is angularly inclined to afford the external conical surface so as to mate with the inner surface of the flange 24 when the cap member 30 is mounted on the body member 10 and the flange 24 is crimped. Furthermore, the base 34 of the cap member 30 is bevelled, as at 38, so as to mate with the bottom 22 of the counterbore 20 when complete mounting of the nut on a bolt or stud 50 has occurred, as shown in FIG. 3. However, as best illustrated in FIG. 2, it is preferred that the length of the floor 37 of the notch be somewhat less than the depth of the flange 24 to allow for material flow when the nut is mounted on a bolt or stud and self-locking is to be accomplished, as hereinafter described.

The thickness of the cylindrical body section 33 of the cap member 30 adjacent the base 34 is such that when the cap member 30 is mounted on the body member 10, the inside diameter of the body section 33 will be substantially equivalent to the minimum thread diameter of the bore 14.

To assemble the nut, the cap member 30 is mounted on the body member 10, as shown in FIG. 2, preferably by press fitting, until the step 36 is in abutment with the top of the flange 24. The flange 24 is then crimped inwardly until the inner surface of the flange 24 is in flush abutment with the notch floor 37. It will be seen that by reason of the angular dispsition of the abutment line of the flange 24 and the floor 37 and the flush abutment of the step 36 on the top of the flange 24, the cap member 30 will be secured against turning relative to the body member 10.

Referring to FIG. 3, when the nut is mounted on a bolt or threaded stud 50 and is being torqued home, as the bolt 50 passes through the body member 10 and enters the cap member 30, the diameter of the body section 33 of the cap member 30 being substantially equivalent to the minimum thread diameter of the bore 14, the threads of the bolt 50 will bite into the body section 33, causing the material of the cap member 30 to flow, filling any void that may be present between the bevelled base 38 of the cap member and the bottom 22 of the counterbore 20, and placing the body section 33 under compression between the crimped flange 24, the body member 10, and the bolt 50, so that the assembled nut will lock on the bolt 50.

Although the invention has been herein shown and described in what is conceived to be the most practical and preferred embodiment thereof, it is recognized that departures may be made therefrom within the scope of the invention, which is not to be limited to the details disclosed herein, but is to be accorded the full scope of the claims so as to embrace any and all equivalent structures and devices.

What is claimed is:
1. A self-locking nut comprising: a body member including a main section and a flange extending therefrom, a threaded bore in the main section to receive a bolt and a coaxial unthreaded counterbore extending through the flange, the bottom of the counterbore providing an annular seat, the counterbore extending from the annular seat being initially generally straight cylindrical, a hollow cap member of softer material than the material of the body member, said cap member embodying a hemispherical dome section and a generally cylindrical engagement section, the inside diameter of the engagement section generally corresponding to the minimum thread diameter of the bore, the engagement section of the cap member embodying an annular base corresponding to the annular seat of the counterbore, and the engagement section also embodying an external annular conical surface angularly intersecting the base and tapering from the intersection axially inwardly, the diameter of the engagement section at said intersection generally corresponding to the maximum diameter of the seat in the counterbore, the engagement section of the cap member being positioned in the counterbore, and the entire flange of the body member being angularly crimped into tight engagement with the conical surface of the cap member, with the base of the cap member in general juxtaposition to the annular seat of the counterbore, whereby the cap member and body member are tightly united and when threads of a bolt bite into the cylindrical section of the cap member the material of the cap member will be under compression both radially and axially in the area between the bolt and the crimped flange.

2. A self-locking nut as defined in claim 1 wherein the annular seat in the counterbore is tapered downwardly and inwardly, and the annular base of the cap member is bevelled correspondingly to the taper of the annular seat.

3. A self-locking nut as defined in claim 1 wherein the terminal end of the flange is initially flat and annular, the cap member embodies an annular step extending radially outward from the tapered surface thereof, the radial dimension of the step generally corresponding with the similar dimension of the end of the flange whereby when the cap member and body member are fully assembled the step is in contact with the inturned end of the flange, and the exterior of the cap member and of the flange are circumferentially flush at the line of contact.

4. A self-locking nut as defined in claim 3 wherein the base of the cap member and the seat of the counterbore are slightly separated when the cap member and body member are united by the crimped flange, thereby providing space for flow of material of the cap member as a bolt moves into the cylindrical section of the latter.

5. A cap nut which comprises: a body member having a wrenching surface having a through, threaded bore, and having a counterbore at one end thereof, the bottom of the counterbore tapering downwardly at an obtuse angle relative to the bore; an annular, substantially axially extending flange on the body member, the inner surface of the flange being defined by the counterbore; a hollow cap member of softer material than the material of the body member, said cap member having a closed hemispherical dome section and a cylindrical body section, the inside diameter of the body section being substantially equivalent to the minimum thread diameter of the bore, and said cap member having a bevelled base, the bevel of the base corresponding to the obtuse angle of the bottom of the counterbore; and a bevelled shoulder spaced from the base and facing in the direction of the body member, said shoulder being defined by an annular recess in the outer surface of the body section of the cap member adjacent the base, the cap member being positioned in the counterbore with the base seated on the floor thereof and with the shoulder abutting the free end of the flange, the flange being crimped inwardly into tight engagement with the annular side wall of the recess on the cap member, the wall thickness of the flange and the radial depth of the recess being substantially equal, whereby the external surfaces of the flange and the dome section are substantially flush, so that when the assembled nut is mounted on a bolt and torqued home, the threads of the bolt will bite into the body section of the cap member, and the material of the cap member will be under compression in the area between the bolt and the crimped flange.

References Cited by the Examiner
UNITED STATES PATENTS 3,080,993    3/1963    Livingstone _____ 215—41

FOREIGN PATENTS 618,388    2/1949    Great Britain.

CARL W. TOMLIN, *Primary Examiner.*

R. S. BRITTS, *Assistant Examiner.*